Dec. 4, 1934.   V. W. KLIESRATH   1,982,816
BRAKE MECHANISM
Filed April 28, 1932   2 Sheets-Sheet 1

INVENTOR.
VICTOR W. KLIESRATH
BY H. O. Clayton
ATTORNEY

Dec. 4, 1934.   V. W. KLIESRATH   1,982,816
BRAKE MECHANISM
Filed April 28, 1932   2 Sheets-Sheet 2
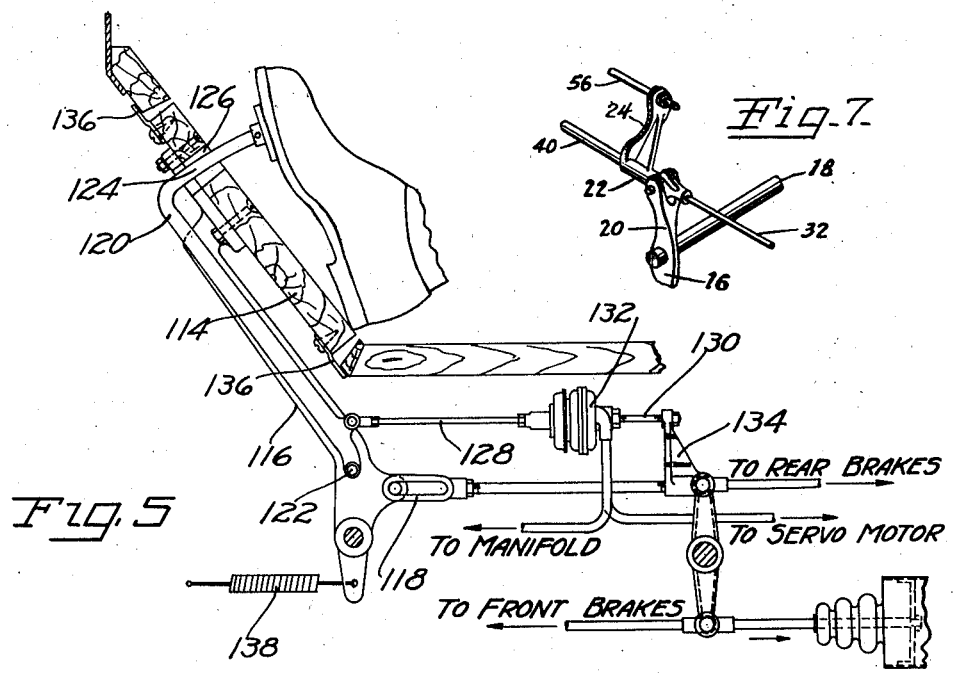
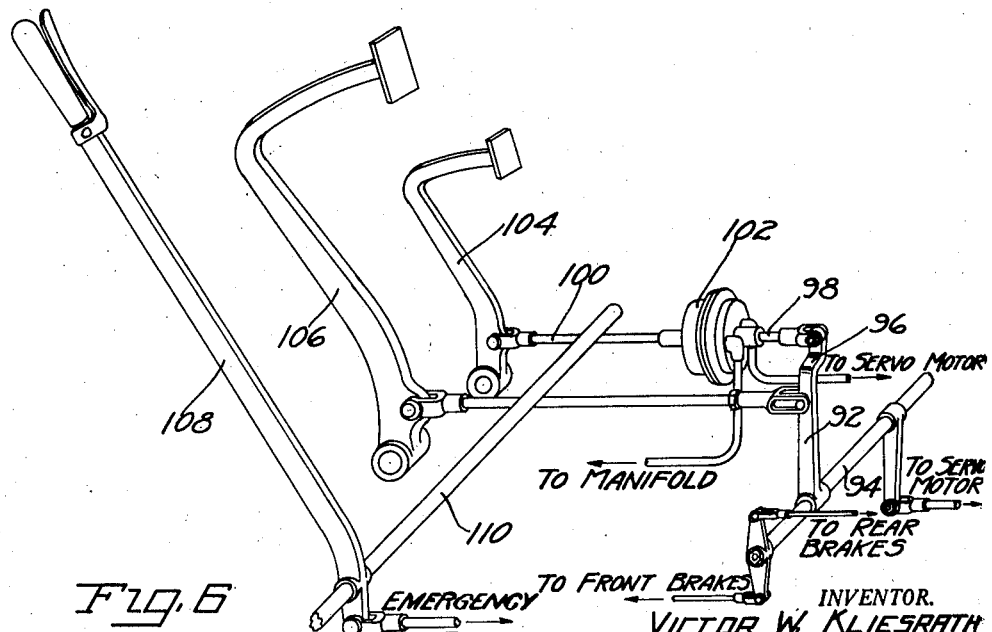
INVENTOR.
VICTOR W. KLIESRATH
BY H. O. Clayton
ATTORNEY Patented Dec. 4, 1934

1,982,816

UNITED STATES PATENT OFFICE 1,982,816

BRAKE MECHANISM

Victor W. Kliesrath, South Bend, Ind., assignor to Bendix Aviation Corporation, South Bend, Ind., a corporation of Delaware Application April 28, 1932, Serial No. 608,075

7 Claims. (Cl. 188—152)

This invention relates in general to brake mechanism for automotive vehicles and in particular to vacuum operated power means for operating said brake mechanism. Such power mechanism has found favor in the trade and is now widely employed in the automotive industry, particularly in the heavier type of vehicles, such as the larger busses and trucks.

The principal object of the invention is to simplify the controls of such power mechanism to thereby facilitate the operation of the mechanism and also reduce installation costs where such an accessory is incorporated in the conventional manually operated brake hook-up.

To the above end there are suggested several arrangements, all including a manually operable miniature or oftentimes called "baby" pedal, said pedal being arranged in the immediate proximity of the conventional brake pedal and operative to control a master valve, the latter controlling the power fluid to energize the servo motor and apply the brakes.

In the preferred embodiments of the invention the miniature pedal is pivotally mounted directly on the conventional brake pedal, the arrangement being such that either the power controlling miniature pedal or the conventional brake pedal may be operated according to the exigencies of the situation or the convenience of the driver.

A particular feature and object of the invention is to so construct and interrelate the conventional brake pedal, the miniature pedal mounted thereon, and a portion of the driving compartment floorboard adjacent the aforementioned pedals that the miniature pedal may first be conveniently operated and that thereafter the brake pedal may be operated directly by said portion of the floorboard, the same being secured to the brake pedal.

Other objects of the invention, such as the compact arrangement of the power brake operating linkage adjacent the conventional brake operating linkage, and other desirable details of construction and combinations of parts will become apparent from the following detailed description of certain preferred embodiments of the invention taken in conjunction with the accompanying drawings, in which:

Figure 5 is a view similar to Figure 1 disclosing, diagrammatically, a modified form of brake operating mechanism;

Figure 1:
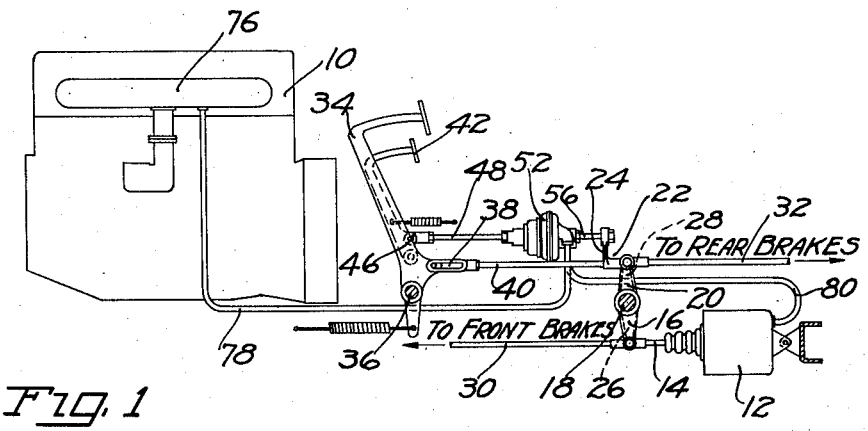
Figure 1 is a diagrammatic view of one embodiment of the brake operating mechanism constituting the present invention.

Figure 6 discloses, diagrammatically and in perspective, another modified form of brake operating mechanism; and Figure 7 is a view in perspective of a detail of Figure 1.

There is disclosed in Figure 1 the essential elements of the brake operating mechanism constituting the present invention comprising, in brief, an internal-combustion engine 10 furnishing a source of power for the vacuum operated power brake mechanism constituting an essential part of the invention. Describing the brake operating mechanism in detail, the same comprises a vacuum operated servo motor 12 operatively connected by a link 14 with a crank arm 16 arranged to operate a conventional cross shaft 18. The cross shaft is provided with a crank 20 to which is secured a one-piece bracket or angular-shaped member 22, an upwardly extending portion 24 of which is offset away from the plane of the crank arm 20 for a purpose to be described in detail hereinafter. Crank arms 26 and 28, shown in dotted lines in Figure 1, are connected respectively to the front and rear brakes by means of rods 30 and 32, respectively. A manually operable conventional brake pedal 34 is pivotally mounted at 36 and is connected by a lost motion pin and slot connection 38 with a link 40, the latter connected to the aforementioned bracket member 22.

Figure 2:
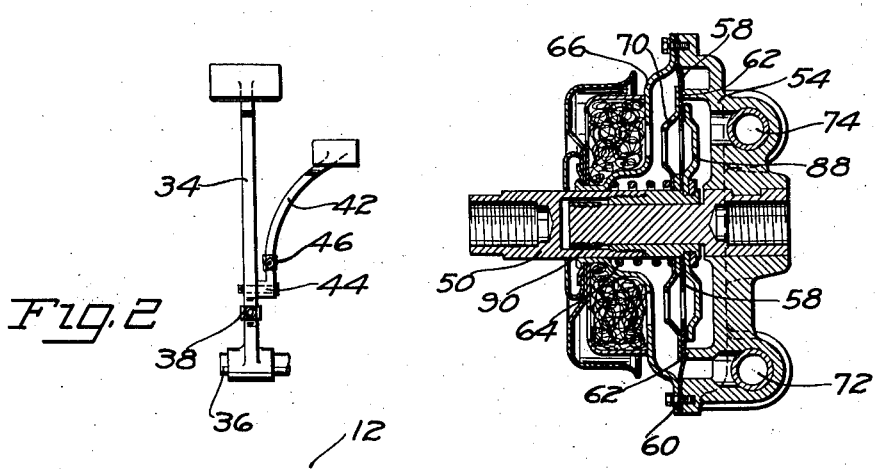
Figure 2 is a front elevational view of the pedal construction disclosed in Figure 1.
Figure 3:
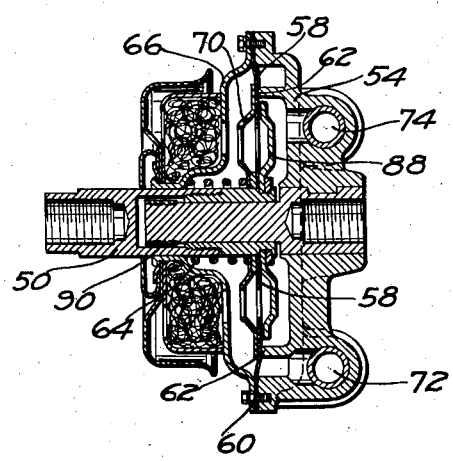
Figure 3 is a sectional view of the controlling valve mechanism for the power brake structure of Figure 1.
Figure 4:
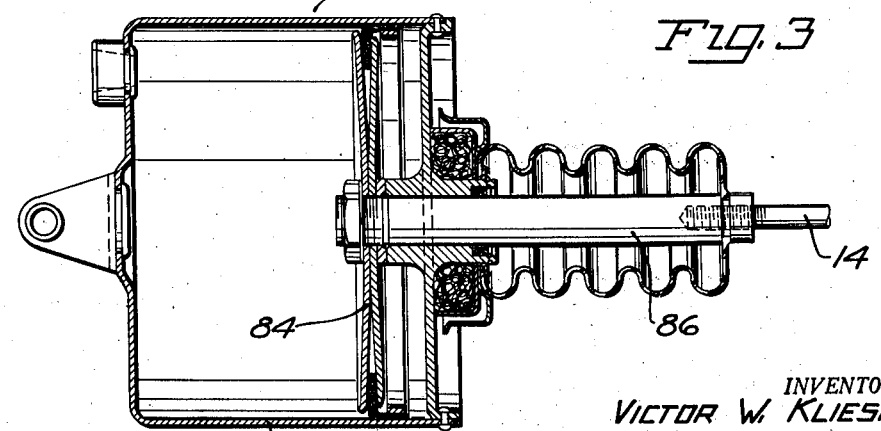
Figure 4 is a sectional view of the power brake servo motor of Figure 1.

As disclosed in Figure 2, there is provided a miniature power brake pedal 42 pivotally mounted on the aforementioned brake pedal at 44, said miniature pedal being curved away from said brake pedal to facilitate operation thereof by the driver. Said miniature power brake pedal is connected at 46 with a link 48, the latter being secured to one part 50 of a control valve member 52, a body part 54 of the latter being secured by a link 56 to the aforementioned curved portion 24 of the bracket member 22. The control valve 52, the details of which form no part of the present invention, inasmuch as the same is covered by Patent No. 1,826,648, dated October 6, 1931, serves to control the operation of the vacuum operated servo motor in a manner well-known in the art. This valve briefly comprises a perforated diaphragm member 58 secured at 60 to the body portion 54 of the valve member, said diaphragm arranged to be seated at 62 by the action of a compression return spring 64 interposed between a perforated cover member 66 and a perforated reenforcing disk member 70. Ports 72 and 74 in the valve body member 54 are connected respectively to a manifold 76 of the internal-combustion engine and to the servo motor 12 by means of conduits 78 and 80, respectively. The vacuum operated servo motor is disclosed in detail in Figure 4 and preferably comprises a cylinder member 82 housing a reciprocable piston member 84, the connecting rod 86 of which is secured by the aforementioned link 14 with the brake operating crank arm 16.

Describing the operation of the aforementioned structure, the driver, desiring to apply the brakes by vacuum power, depresses the miniature pedal member 42, resulting in first cutting off the communication between the atmosphere and the servo motor via openings or perforations in the members 58, 66 and 70. This is effected by movement of a disk member 88 contacting the aforementioned diaphragm member 58. Subsequent movement of the miniature pedal unseats the diaphragm valve member thereby intercommunicating the manifold with the servo motor via the conduits 78 and 80. The servo motor is thus energized by evacuating the left compartment of the same, the reduced pressure within the intake manifold at throttle cut out idling speeds effecting the desired vacuum to energize the motor. The aforementioned evacuating operation is well-known in the art; therefore, it needs no further amplification.

Should the driver desire to retain the brakes applied with a definite load from the servo motor, he maintains the miniature pedal in a held position whereupon the movement of the crank 20 and connected valve part 54 under the action of the then operating piston serves to lap the valve. By the latter term is meant the closing off of the connection between the servo motor and the manifold and atmosphere by the reseating of the valve diaphragm member 58 without, however, unseating the disk 88.

Should the operator desire to impart an additional load upon the brakes from the power mechanism, he again operates the miniature pedal, resulting in the repetition of the aforementioned cycle of operation. Should the power mechanism fail for any reason, such, for example, with the breaking of one of the aforementioned conduits, the brake may be applied physically through the intermediary of the aforementioned miniature pedal and its valvular connection with the brake linkage by means of a lost motion connection at 90 in the valve structure. If the said lost motion is taken up, obviously the two valve parts 50 and 54 move as one with the manual operation of the miniature pedal, resulting in the brake mechanism being applied directly by the operator through the intermediary of the power brake mechanism.

During the operation of the brakes by power the conventional brake pedal 34 is not operated by virtue of the lost motion pin and slot connection at 38. Should the operator, however, desire to employ the conventional brake operating linkage, it is obvious that the brakes may be applied directly through the intermediary of the brake pedal and link 40, the pin of the aforementioned lost motion connection 38 being located in the end of the slot in the brake off position.

The distinguishing feature of the aforementioned structure is the compact arrangement of the power brake mechanism in conjunction with a conventional manually operated brake linkage. The offset bracket member 22 and the curved miniature pedal 42 may be readily incorporated as accessories with the brake pedal 34 and linkage parts 40 and 20.

There is disclosed in Figure 6 a modified arrangement of the power brake mechanism wherein a crank arm 92 secured to a cross shaft 94 is offset at 96, the upper end of the offset portion being connected by links 98 and 100 and interposed valve 102 with a miniature power brake pedal 104 mounted conveniently near a conventional brake pedal 106 to facilitate operation thereof by the driver. A brake operating lever 108 serves to operate a cross shaft member 110, connected to an emergency or parking brake of any preferred construction.

There is disclosed in Figure 5 a preferred species of the present invention wherein a portion 114 of the floorboard of the driving compartment of the vehicle constitutes a treadle member secured to the conventional body portion of the usual brake pedal 116. This brake pedal is connected by pin and slot connection 118 to linkage connected with the usual front and rear brakes in a manner similar to that previously described. A further feature of this construction relates to the provision of a power operating miniature pedal 120 which is pivotally mounted at 122 to the body of the brake pedal member 116, the conventional inwardly turned portion 124 of the miniature pedal extending through an opening 126 in the aforementioned floorboard treadle portion 114 of the conventional brake pedal member. This hook-up is completed by links 128 and 130, valve 132 and offset or curved bracket 134, which construction is identical with that disclosed in Figure 1.

The important feature of the aforementioned modification is the construction of the treadle portion 114 of the pedal member 116 and its cooperating power brake pedal member 120. The wooden floorboard treadle member is provided with stops 136 contacting the edges of the contiguous floorboard portions of the driving compartment, a return spring 138 urging the pedal member 116 and its floorboard treadle portion into the brake off position of parts wherein the treadle portion 114 presents, with the contiguous floor, a smooth surface. The treadle 114 may also serve as a rest for the heel of the driver's foot in operating the power brake or miniature pedal 120. Should the power brake mechanism fail, it is obvious that the entire foot of the operator may be depressed to operate the treadle portion 114 to thereby manually apply the brakes in such an emergency. The aforementioned arrangement obviously minimizes the number of exposed controls in the floorboard compartment, the end of the miniature pedal 120 being disclosed only a relatively short distance from the face of the treadle portion 114.

There is thus provided a very simple combined power and manually operable brake mechanism, the power mechanism being readily installed as an accessory in a conventional brake operating linkage. To this end the only variance from common practice other than the pedal construction resides in the offset crank arm member secured to the cross shaft and the lost motion connection between the conventional brake pedal and said crank arm.

It will be understood that while the illustrated embodiments of the invention are described as shown, a considerable latitude is to be permitted in construction within the scope of the appended claims.

I claim:

1. Brake operating mechanism for an automotive vehicle comprising in combination with a brake to be operated, a manually operable pedal member, linkage including a lost motion connection interconnecting the pedal with the brake, said linkage including a cross shaft, a crank arm extending from said shaft, and a link connecting said arm with the pedal, power means for operating the brake including a servo motor, connections interconnecting said motor with the aforementioned linkage, a miniature power brake pedal pivotally mounted on the aforementioned pedal, and connections including a valve member interconnecting said miniature pedal with said crank arm.

2. Brake operating mechanism for an automotive vehicle comprising in combination with a brake to be operated, a manually operable pedal member, linkage interconnecting the pedal with the brake, said linkage including a cross shaft, a crank arm extending from said shaft, and a link connecting said arm with the pedal, said crank arm provided with an offset portion beyond the connection between said arm and link, power means for operating the brake including a servo motor, connections interconnecting said motor with the aforementioned linkage to operate the brake by power, a miniature power brake pedal arranged adjacent the aforementioned pedal and conveniently accessible to the driver, and means interconnecting said miniature pedal and said offset portion of the aforementioned crank arm, said latter means including a valve for controlling the operation of said servo motor.

3. Brake operating mechanism for an automotive vehicle comprising in combination with a brake to be operated, a manually operable member, linkage interconnecting said manually operable member with the brake, said linkage including a cross shaft, a crank arm extending from said shaft, and a link connecting said arm with the pedal, said crank arm being provided with an offset portion extending away from the plane of said manually operable member, link and crank arm, power means for operating the brake including a servo motor, means connecting said motor with the aforementioned linkage for operating the brake by power, a miniature manually operable member arranged in immediate proximity to the aforementioned manually operable member, and connections interconnecting said miniature member with the offset portion of the crank arm, said latter means including a valve for controlling the operation of the servo motor.

4. Brake mechanism for an automotive vehicle comprising in combination with brake mechanism to be operated, a manually operable pedal member, means interconnecting said pedal with the brake to operate the latter manually, and power means for operating the brake, said power means including a miniature lever member pivotally mounted on said pedal member, and linkage interconnecting said miniature pedal member with the brake mechanism to control the operation of the power mechanism and also apply the brake mechanism by the physical effort of the driver in the event of failure of the power brake mechanism.

5. Brake operating mechanism for an automotive vehicle comprising in combination with a brake to be operated, a manually operable pedal, linkage interconnecting the pedal with the brake, said linkage including a cross shaft, a crank arm extending from said shaft, and a link interconnecting said arm with the pedal, said crank arm being offset at its outer end, power means for operating the brake including a servo motor, connections interconnecting said motor with the aforementioned linkage, a miniature power brake pedal pivotally mounted on said aforementioned manually operable pedal, said miniature pedal being so shaped as to extend away from the plane of said first mentioned pedal and connections interconnecting said miniature pedal with the offset portion of the crank arm, said connections including a valve means for controlling the power brake operating mechanism and said connections being arranged substantially parallel to and in juxtaposition with the aforementioned link interconnecting the manually operable pedal with the crank arm.

6. Brake operating mechanism for an automotive vehicle including in combination with a brake to be operated and the floorboard portion of the driving compartment of the vehicle, a manually operable pedal member, linkage interconnecting the pedal with the brake to be operated, power brake mechanism for operating said brake, said power brake mechanism including a miniature pedal pivotally mounted on the aforementioned pedal, said miniature pedal extending through a portion of the floorboard, said latter portion constituting the treadle portion of the aforementioned manually operable pedal member.

7. Brake operating mechanism for an automotive vehicle comprising in combination with the brake to be operated and the driving compartment of the vehicle, a manually operable brake operating member, said member extending substantially parallel to an inclined portion of the floor of the driving compartment, said pedal member being further characterized by a treadle portion, the latter constituting a portion of the inclined floorboard of the driving compartment, and a miniature pedal member pivotally mounted on the aforementioned pedal member, said miniature pedal being provided with a return bent portion extending through the aforementioned floorboard treadle portion of the first mentioned pedal member.

VICTOR W. KLIESRATH.